(12) United States Patent
McGehee et al.

(10) Patent No.: US 8,231,775 B2
(45) Date of Patent: Jul. 31, 2012

(54) PITCH COMPOSITION

(75) Inventors: James F. McGehee, Mount Prospect, IL (US); Ronald S. Smyczynski, Northlake, IL (US)

(73) Assignee: UOP LLC, Des Plaines, IL (US)

( * ) Notice: Subject to any disclaimer, the term of this patent is extended or adjusted under 35 U.S.C. 154(b) by 113 days.

(21) Appl. No.: 12/815,599

(22) Filed: Jun. 15, 2010

(65) Prior Publication Data

US 2010/0326882 A1 Dec. 30, 2010

Related U.S. Application Data

(60) Provisional application No. 61/220,287, filed on Jun. 25, 2009.

(51) Int. Cl.
*C10C 3/00* (2006.01)

(52) U.S. Cl. ............................... 208/22; 208/23; 208/39

(58) Field of Classification Search .................... 208/22, 208/23, 39–45
See application file for complete search history.

(56) References Cited

U.S. PATENT DOCUMENTS

| | | |
|---|---|---|
| 3,865,574 A | 2/1975 | Long et al. |
| 4,525,267 A | 6/1985 | Inooka |
| 4,549,904 A | 10/1985 | Matsumiya et al. |
| 4,601,813 A | 7/1986 | Izumi et al. |
| 4,655,903 A | 4/1987 | Rahbe et al. |
| 4,663,022 A | 5/1987 | Gomi et al. |
| 4,673,486 A | 6/1987 | Orihashi et al. |
| RE32,792 E | 11/1988 | Izumi et al. |
| 4,963,247 A | 10/1990 | Belinko et al. |
| 4,969,988 A | 11/1990 | Jain et al. |
| 5,273,623 A | 12/1993 | Granelli |
| 5,312,543 A | 5/1994 | Taylor et al. |
| 5,320,741 A | 6/1994 | Johnson et al. |
| 5,328,596 A | 7/1994 | Gammie, II |
| 5,374,348 A | 12/1994 | Sears et al. |
| 5,755,955 A | 5/1998 | Benham et al. |
| 5,916,826 A | 6/1999 | White |
| 6,001,162 A | 12/1999 | Hayner et al. |
| 6,048,448 A | 4/2000 | Nirell |
| 6,297,353 B1 | 10/2001 | Fuenzalida Diaz et al. |
| 6,331,245 B1 | 12/2001 | Moretta et al. |
| 6,361,682 B1 | 3/2002 | Moretta et al. |

(Continued)

FOREIGN PATENT DOCUMENTS

GB 1170741 A 11/1966

(Continued)

OTHER PUBLICATIONS

U.S. Appl. No. 12/491,439, filed Jun. 25, 2009, McGehee.

(Continued)

*Primary Examiner* — Ellen McAvoy
(74) *Attorney, Agent, or Firm* — James C Paschall

(57) ABSTRACT

A process and apparatus is disclosed for converting heavy hydrocarbon feed into lighter hydrocarbon products. The heavy hydrocarbon feed is slurried with a particulate solid material to form a heavy hydrocarbon slurry and hydrocracked in a slurry hydrocracking unit to produce vacuum gas oil (VGO) and pitch. A first vacuum column separates VGO from pitch, and a second vacuum column further separates VGO from pitch. As much as 15 wt-% of VGO can be recovered by the second vacuum column and recycled to the slurry hydrocracking unit. A pitch composition is obtained which can be made into particles and transported without sticking together.

18 Claims, 3 Drawing Sheets

U.S. PATENT DOCUMENTS

| | | | |
|---|---|---|---|
| 6,660,157 | B2 | 12/2003 | Que et al. |
| 7,318,890 | B1* | 1/2008 | Malone ............... 208/41 |
| 7,384,540 | B2 | 6/2008 | Galeazzi |
| 2004/0232041 | A1* | 11/2004 | Kiser et al. ............ 208/22 |
| 2004/0232045 | A1 | 11/2004 | Simmons et al. |
| 2005/0006279 | A1 | 1/2005 | Gueret et al. |
| 2006/0006101 | A1 | 1/2006 | Eppig et al. |
| 2006/0118466 | A1 | 6/2006 | Galeazzi et al. |
| 2007/0034550 | A1 | 2/2007 | Hedrick et al. |
| 2007/0108098 | A1 | 5/2007 | Flint et al. |
| 2007/0144944 | A1 | 6/2007 | Del Bianco et al. |
| 2007/0232846 | A1 | 10/2007 | Baumgartner et al. |
| 2007/0278088 | A1 | 12/2007 | Musial |
| 2008/0156693 | A1 | 7/2008 | Okui et al. |
| 2008/0210600 | A1 | 9/2008 | O'Connor et al. |
| 2008/0230440 | A1 | 9/2008 | Graham et al. |
| 2008/0230442 | A1 | 9/2008 | Iqbal et al. |
| 2008/0289999 | A1 | 11/2008 | Lenglet |
| 2009/0000985 | A1 | 1/2009 | Van Wees et al. |
| 2010/0122931 | A1* | 5/2010 | Zimmerman et al. ........ 208/50 |
| 2010/0122932 | A1* | 5/2010 | Haizmann et al. ........... 208/55 |
| 2010/0243518 | A1* | 9/2010 | Zimmerman et al. ........ 208/45 |

FOREIGN PATENT DOCUMENTS

| | | |
|---|---|---|
| WO | WO 96/07716 A1 | 3/1996 |
| WO | WO 2004/041495 | 5/2004 |

OTHER PUBLICATIONS

U.S. Appl. No. 12/491,444, filed Jun. 25, 2009, McGehee.

International Safe Transit Assn., Ocean Container Temp and Humidity Study, Preshipment Testing Newsletter (2nd Quarter 2006).

McNally & McCourt, M., Density Measurement of Thermoplastic Powders During Heating and Cooling Cycles, ANTEC 2002 Conference Proceedings, 1956-1960.

Goelzer, A. et al., Flash Drum Options and Systems, Petroleum Technology Quarterly 7(3) 2002, p. 81-82, 84-86,88,91.

George, S.E. et al., Advances in Catalytic Hydroprocessing of Residues and Heavy Oils, 3rd Unitar Heavy Crude Tar Sands Int. Conf, Long Beach, CA 1985, V4 1849-67.

Gardiner, A., Thermal cracking in refining, Today's Refinery (ISSN 1048-0935) V10 N.7, 31-34 (Oct. 1996).

Banta, F. et al., Lube oil processing—2. Improved proc. produce high quality lubes, 4th Ann. Fuels & Lubes Asia Conf. (Singapore Jan. 14, 1998) Oil & Gas Jour. V96, N28, 70-74.

Nelson, W.L., Process costimating—156B. Joint-Product Costing, Calculating Value by Alternate Uses, Oil & Gas Jour. V73, N25 94, 99-100 (Jun. 23, 1975) PennWell.

Hunkus, S. et al., Heavy oil processing. Visbreaking, National Petrochemical and Refiners Assn. Transcripts 1990-1999 2000 p. 3.

Thinnes, B., HPin construction: Europe: Fluor Corp., Hydrocarbon Processing 87(1) 2008 p. 36 Gulf Publishing Company.

Petroleum Economist 74 (12), Nov. 2007 p. 1, News in brief: Western Europe: Portugal: GALP to upgrade Porto refinery.

Redepenning, K.H., Reuse of wastes, Feasibility of chemical recycling of wastes, 2nd Euro. Economics and Management of Energy Industry, (Portugal, Apr. 1994), English Abstrac.

Farina, G.L. et al., Hydrocarbon Processing (ISSN 0018-8190) V72 N.11 52-54,56 (Nov. 1993) Gulf Publishing Co.

Schneider, D.F. et al., Deep cut vacuum tower processing provides major incentives, Hydrocarbon Processing, V76 N.11, 83-84, 86, 88-89 (Nov. 1997) Gulf Publishing Co.

Yang, B., A Discussion on Deep Vacuum Distillation, Petroleum Refinery Engineering V26 N2 10-14, (Mar. 25, 1996), Chinese with English Abstract.

Schneider, D.F. et al., Deep cut vacuum tower incentives for various crudes, AiChE 1997 Spring National Meeting (Houston Mar. 9-13, 1997) Preprint N. 131 e 26P.

Boduszynski et al., Deep-cut assay reveals aditional yields of high-value VGO, Oil & Gas Journal (ISSN 0030-1388) V93 N37 39-45 (Sep. 11, 1995) PennWell.

Golden et al., Troubleshoot vacuum columns with low-capital methods, Hydrocabon Processing, V72 N7, 81-82, 85-86, 88-89 (Jul. 1993) Gulf Publishing Company.

Nygren et al., High vacuum fractionation, selection of equipment, 63rd AICHE ANN Mtg. (Chicago Nov. 29-Dec. 3, 1970) Preprint N20A 66P.

Berven et al., Process energy savings retrofitting existing (distillation) columns, by HESP, AICHE 1987 Spring Natl. Mtg., (Houston Mar. 29-Apr. 2, 1987) Prepr. N. 15D 31P.

Takahashi, A discussion of Chevron RDS/VRDS process, Petrotech (ISSN 0386-2763) V14 N. 10 978-80 (Oct. 1991), English Translation.

Benezech et al., Condensing at a very low pressure . . . 2007 AiChE Spring National Meeting 2007 p. Houston, TX, American Institute of Chemical Engineers.

Dekhterman et al., Results of modernizing the vacuum section of a large capacity atmospheric vacuum pipe still unit, Khim I Tekhnol, V13 N2 912 (1968) English Translatio.

Berlin et al., Developmental status of vacuum distillation plants . . . , 5th KDT Therm Separations Comm Mtg (Frankfurt) 1982, Chem. tech. V34 N. 12, 620-24, English Translatio.

Suzuki et al., Development of a Pitch Gasification Process—Thermal Cracking, J. Jpn. Pet. Inst., V26 N.2 129-37 (Mar. 1983) Japan Petroleum Institute, English Abstract.

New Products: Pastillation improves the handling of sulfur, Chemical Engineering, 110 (13) 2003 p. 24I-2, Dec. 2003 (Abstract only).

Sandvik—Dust free granulation from melt to solid in one step, Chemical Engineering 110(1) Dec. 2003 p. 38, Chemical Week Association.

Rubchevskij, et al., Plant for producing the granulated coal tar pitch, Koks i Khimiya, n3, pp. 22-23, 2004, in Russian Language with English Abstract.

Gorobtsov et al., Manufacturing the granulated pitch, Metallurg, n 5, p. 20—Language—Russian (with English Abstract).

Saint Romain et al., Delivery of pitch in solid processed form, Light Metals 1990, p. 639-643, 1990, 119th TMS Ann Mtg, Publ. Minerals, Metals & Materials Soc.

Uhlemann, Hans, Continuous fluidized bed spray granulation, Chemie-Ingenieur-Technik, v 62, n 10, p. 822-834, Oct, Language German with English Abstract.

Lamprecht, R, High performance granulation. Versatile and efficient Rotoform process. CIT plus 11 (9) 2008 p. 47 Wiley-VCH Verlag, language—German (English Abstract.

Mortensen et al., Spray drying for the production of dust free powders and fine granulates, Chemie-Technik (Heidelberg), v 21, n 6, June, Language German, (English Abstract).

Muhammad et al., Why ASEAN Bintulu fertilizer makes commercial sense, 13th Int. LNG/LPG "Gastech 88" Conf. (Kuala Lumpur 1988, Prepr N. 1-7 V1 Session 1 29 p.

Nastren et al., granulation andinfiltration processes for the fabrication of minor actinidefuels, Journ of Nuclear Materials, v 362, n 2-3, p. 350-355, May 31, 2007.

Tricil, New Twist for Tricil System, Canadian Chemical Processing, V66 N2 p. 10 (Mar. 26, 1982) Southam Business.

Sandvik, Sulfur technology review: Sandvik, Hydrocarbon Engineering 10(4) 2005 p. 41-42 Palladian Publication.

* cited by examiner

PITCH COMPOSITION

CROSS-REFERENCE TO RELATED APPLICATION

This application claims priority from Provisional Application No. 61/220,287 filed Jun. 25, 2009, the contents of which are hereby incorporated by reference.

BACKGROUND OF THE INVENTION

This invention relates to a process and apparatus for the treatment of crude oils and, more particularly, to the hydroconversion of heavy hydrocarbons in the presence of additives and catalysts to provide useable products and further prepare feedstock for refining conversion units such as FCC or hydrocracking.

Hydroconversion processes for the conversion of heavy hydrocarbon oils to light and intermediate naphthas of good quality and for reforming feedstocks, fuel oil and gas oil are well known. These heavy hydrocarbon oils can be such materials as petroleum crude oil, atmospheric tower bottoms products, vacuum tower bottoms products, heavy cycle oils, shale oils, coal-derived liquids, crude oil residuum, topped crude oils and the heavy bituminous oils produced from oil sands. Of particular interest are the oils produced from oil sands and which contain wide boiling range materials from naphthas through kerosene, gas oil, pitch, etc., and which contain a large portion of material boiling above 538° C. (1000° F.).

As the reserves of conventional crude oils decline, these heavy oils must be upgraded to meet demands. In this upgrading, the heavier materials are converted to lighter fractions and most of the sulfur, nitrogen and metals must be removed. Crude oil is typically first processed in an atmospheric crude distillation tower to provide fuel products including naphtha, kerosene and diesel. The atmospheric crude distillation tower bottoms stream is typically taken to a vacuum distillation tower to obtain vacuum gas oil (VGO) that can be feedstock for an FCC unit or other uses. VGO typically boils in a range between at or about 300° C. (572° F.) and at or about 538° C. (1000° F.). The bottoms of the vacuum tower typically comprises at least about 9 wt-% hydrogen and a density of less than about 1.05 g/cc on an ash-free basis excluding inorganics. The vacuum bottoms are usually processed in a primary upgrading unit before being sent further to a refinery to be processed into useable products. Primary upgrading units known in the art include, but are not restricted to, coking processes, such as delayed or fluidized coking, and hydrogen-addition processes such as ebullated bed or slurry hydrocracking (SHC). All of these primary upgrading technologies such as delayed coking, ebullated bed hydrocracking and slurry hydrocracking enable conversion of crude oil vacuum bottoms to VGO boiling in the range between approximately 343 and 538° C. (650-1000° F.) at atmospheric equivalent conditions.

At the preferred conversion level of 80-95 wt-% of materials boiling above 524° C. (975° F.) converting to material boiling at or below 524° C. (975° F.), SHC produces a pitch byproduct at a yield of approximately 5-20 wt-% on an ash-free basis. By definition, pitch is the hydrocarbon material boiling above 538° C. (1000° F.) atmospheric equivalent as determined by any standard gas chromatographic simulated distillation method such as ASTM D2887, D6352 or D7169, all of which are used by the petroleum industry. These definitions of "conversion" and "pitch" narrow the range of converted products relative to pitch conversion. The pitch byproduct is solid at room temperature and has minimum pumping temperatures in excess of 250° C., which make it impractical to move over any great distance, since the pipeline would need to be jacketed with hot oil or electrically heated. It also contains inorganic solid material, which can settle out. Hence, tank storage requires stirring or circulation to prevent settling, an additional capital and operating expense.

Cohesion in solids will take place when heated into the softening region. The onset of sticking, or softening point, is difficult to determine and may require time-consuming empirical tests, for example by consolidating the solids under the expected load in a silo, followed by measuring the shear force required to move the solids. Such standard tests include ASTM D6773, using the Schulz ring-shear tester, and ASTM D6128, using the Jenike ring-shear tester. Pitch is not a pure compound and melts over a wide range. Therefore, Differential Scanning Calorimetry (DSC) will not pick up a definite melting peak that can be used as a rapid instrumental procedure.

The softening point of pitches has traditionally been measured using the Ring and Ball Softening Point Method, ASTM D36, or Mettler Softening Point Method, ASTM D3104. Both of these methods are useful for determining the temperature at which the material will begin liquid flow. This can be used, among other things, to set the minimum temperature for pitch as a liquid in the preparation of asphalt binder for paving, roofing and other and industrial uses. However, this information tells nothing about the onset of softness and cannot be directly used to determine at what point the solid will undergo plastic deformation, or start to stick together.

Solidification of pitch can be accompanied by dust generation because pitch with a higher onset of softening point can become brittle. However, pitch with lower onset of softening point can become sticky which makes handling in bulk difficult.

Better methods for processing pitch produced from SHC are needed to provide pitch that is more easily managed. Additionally, better methods are needed for assessing how easily pitch can be managed.

SUMMARY OF THE INVENTION

We have found that utilizing a second vacuum column in the recovery of products from SHC reactor provides pitch that is less sticky and can be solidified more easily. The second vacuum column further separates VGO from pitch and the VGO may be recycled to the slurry hydrocracking reactor. A portion of the pitch from the first vacuum column may be recycled to the slurry hydrocracking reactor. Use of the second vacuum column allows for lower temperatures in both of the vacuum columns which reduce coking and cracking concerns. Pitch byproduct may then be formed into solid particles that are free-flowing bulk solids that can be more easily managed at expected transportation temperatures. Use of two vacuum columns also enables lower pitch temperature to avoid coking in heating apparatuses. Pitch with hydrogen concentrations of no more than about 7.3 wt-% and VGO concentrations of no more than 30 wt-% do not become sticky in their solid form when subjected to anticipated transportation temperatures. In other words, the pitch exhibits an onset of softening point temperature of at least 66° C.

BRIEF DESCRIPTION OF THE DRAWINGS

For a better understanding of the invention, reference is made to the accompanying drawings.

DESCRIPTION OF THE PREFERRED EMBODIMENTS

The process and apparatus of this invention is capable of converting a wide range of heavy hydrocarbon feed stocks into lighter hydrocarbon products. It can process aromatic feedstocks, as well as feedstocks which have traditionally been very difficult to hydroprocess, e.g. vacuum bottoms, visbroken vacuum residue, deasphalted bottom materials, off-specification asphalt, sediment from the bottom of oil storage tanks, etc. Suitable feeds include atmospheric residue boiling at or above about 343° C. (650° F.), heavy vacuum gas oil (VGO) and vacuum residue boiling at or above about 426° C. (800° F.) and vacuum residue boiling above about 510° C. (950° F.). Throughout this specification, the boiling temperatures are understood to be the atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures". Furthermore, the term "pitch" is understood to refer to vacuum residue, or material having an AEBP of greater than about 538° C. (1000° F.).

The apparatus comprises a slurry hydrocracking reactor 20, a first vacuum column 90 and a second vacuum column 100. A fractionation column 50 may prepare slurry hydrocracked product for the first vacuum column 100 and a granulating machine 130 may solidify pitch into solid particles.

Figure 1:
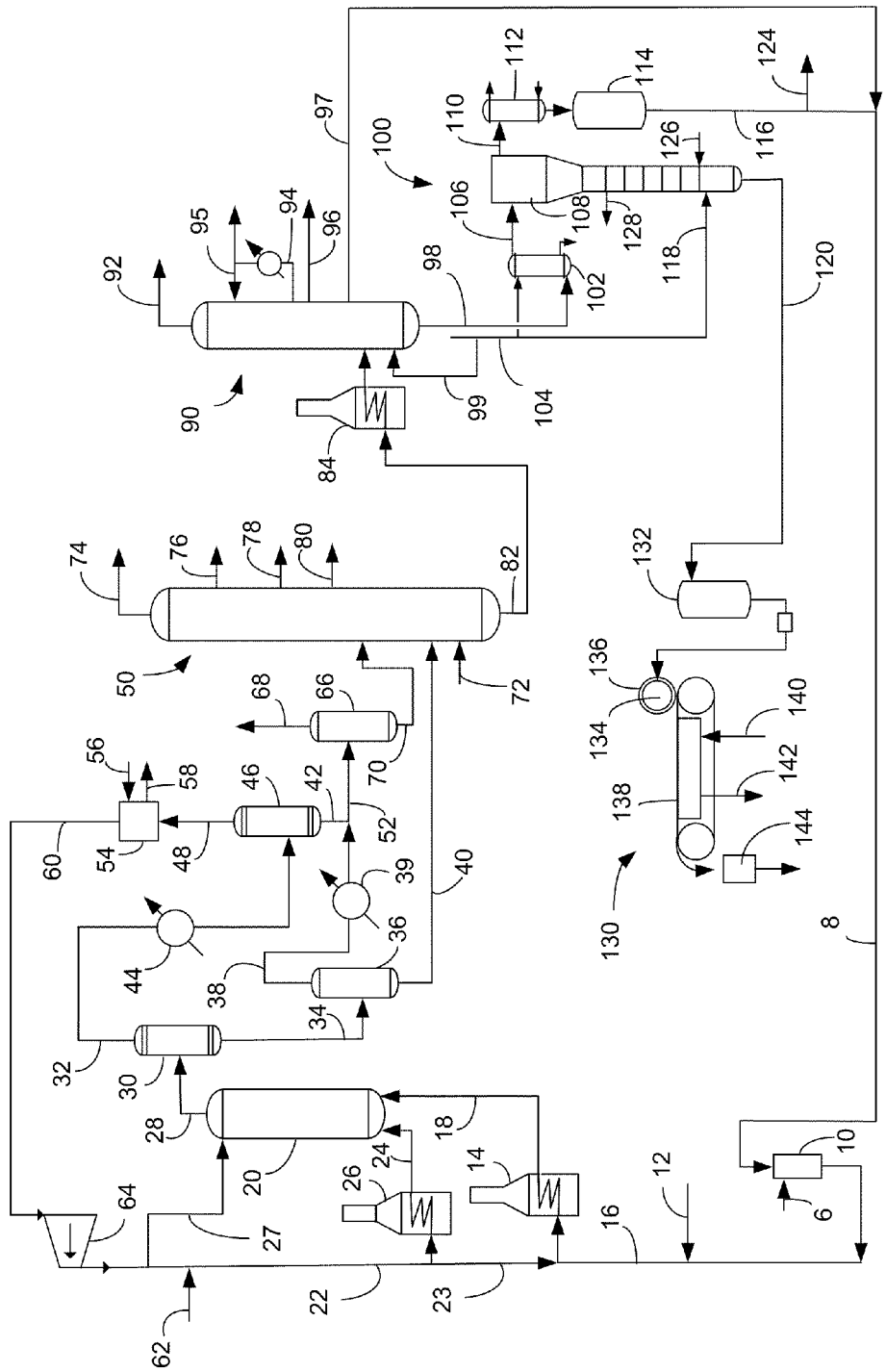
FIG. 1 is a schematic flow scheme showing a process and apparatus of the present invention.

In the SHC process as shown in FIG. 1, a coke-inhibiting additive or catalyst of particulate material in line 6 is mixed together with a heavy hydrocarbon recycle such as recycled heavy VGO (HVGO) and/or pitch in line 8 in a feed tank 10 to form a well-mixed homogenous slurry. A variety of solid catalyst particles can be used as the particulate material, in an aspect, provided these solids are able to survive the hydrocracking process and remain effective as part of the recycle. Particularly useful catalyst particles are those described in U.S. Pat. No. 4,963,247. Thus, the particles are typically ferrous sulfate having particle sizes less than 45 μm and with a major portion, i.e. at least 50% by weight, in an aspect, having particle sizes of less than 10 μm. Iron sulfate monohydrate is the preferred catalyst. Bauxite catalyst may also be preferred. In an aspect, 0.01 to 4.0 wt-% of coke-inhibiting catalyst particles based on fresh feedstock are added to the feed mixture. Oil soluble coke-inhibiting additives may be used alternatively or additionally. Oil soluble additives include metal naphthenate or metal octanoate, in the range of 50-1000 wppm based on fresh feedstock with molybdenum, tungsten, ruthenium, nickel, cobalt or iron.

This slurry from feed tank 10 and heavy hydrocarbon feed in line 12 are pumped into a fired heater 14 via line 16. The combined feed is heated in the heater 14 and pumped through an inlet line 18 into an inlet in the bottom of a tubular SHC reactor 20. In the heater 14, iron-based catalyst particles newly added from line 6 typically thermally decompose to smaller ferrous sulfide which is catalytically active. Some of the decomposition will take place in the SHC reactor 20. For example, iron sulfate monohydrate will convert to ferrous sulfide and have a particle size less than 0.1 or even 0.01 μm upon leaving heater 14. The SHC reactor 20 may take the form of a three-phase (solid-liquid-gas) reactor without a stationary solid bed through which catalyst, hydrogen and oil feed are moving in a net upward motion with some degree of backmixing.

Many mixing and pumping arrangements may be suitable. For example, the feed in line 12 may be mixed with catalyst from line 6 in the tank 10 instead of or in addition to the heavy oil recycle in line 8. It is also contemplated that feed streams 8 and 12 may be added separately to the SHC reactor 20 instead of being mixed together.

Recycled hydrogen and make up hydrogen in line 22 are fed into the SHC reactor 20 through line 24 after undergoing heating in heater 26. The hydrogen in line 24 may be added at a location above the feed entry location in line 18. Both feed from line 18 and hydrogen in line 24 may be distributed in the SHC reactor 20 with an appropriate distributor. Additionally, hydrogen in line 23 may be added to the feed in line 16 before it is heated in heater 14 and delivered to the SHC reactor in line 18 as shown. It is also contemplated that a single heater 14 could potentially be used to heat a combined stream of gas, feed, and catalyst to produce the feed stream in line 18, in which case, heater 26 and line 24 can be omitted.

During the SHC reaction, it is important to minimize the formation of coke or other material which tends to precipitate liquid, solid or semi-solid phases from the bulk material in the reactor. This can cause fouling of the reactor or downstream equipment. Adding a relatively polar aromatic oil to the feedstock is one means of minimizing coke or other precipitate. HVGO is a polar aromatic oil. In an aspect, recycled HVGO in line 8 makes up in the range of 0 to 50 wt-% of the feedstock to the SHC reactor 20, depending upon the quality of the feedstock and the once-through conversion level. The feed entering the SHC reactor 20 comprises three phases, solid catalyst, liquid hydrocarbons and gaseous hydrogen and vaporized hydrocarbon.

The process of this invention can be operated at quite moderate pressure, in an aspect, in the range of 3.5 to 24 MPa, without coke formation in the SHC reactor 20. The reactor temperature is typically in the range of about 350° to 600° C. with a temperature of about 400° to 500° C. being preferred. The LHSV is typically below about 4 $h^{-1}$ on a fresh feed basis, with a range of about 0.1 to 3 $hr^{-1}$ being preferred and a range of about 0.2 to 1 $hr^{-1}$ being particularly preferred. The per-pass pitch conversion may be between 50 and 95 wt-%. The hydrogen feed rate is about 674 to about 3370 $Nm^3/m^3$ (4000 to about 20,000 SCF/bbl) oil. Although SHC can be carried out in a variety of known reactors of either up or downflow, it is particularly well suited to a tubular reactor through which feed and gas move upwardly. Hence, the outlet from SHC reactor 20 is above the inlet. Although only one is shown in the FIG. 1, one or more SHC reactors 20 may be utilized in parallel or in series. Because the liquid feed is converted to vaporous product, foaming tends to occur in the SHC reactor 20. An antifoaming agent may also be added to the SHC reactor 20, in an aspect, to the top thereof, to reduce the tendency to generate foam. Suitable antifoaming agents include silicones as disclosed in U.S. Pat. No. 4,969,988. Additionally, hydrogen quench from line 27 may be injected into the top of the reactor to cool the slurry hydrocracked product. It is also contemplated that the quench line could alternatively comprise a VGO, diesel or other hydrocarbon stream.

A hydrocracked stream comprising a gas-liquid mixture is withdrawn from the top of the SHC reactor 20 through line 28. The hydrocracked stream from the top of the SHC reactor 20 is a vapor-liquid mixture consisting of several products including VGO and pitch that can be separated in a number of different ways. The hydrocracked effluent from the top of the SHC reactor 20 is in an aspect, separated in a hot, high-pressure separator 30 kept at a separation temperature between about 200° and 470° C. (392° and 878° F.), and in an aspect, at about the pressure of the SHC reaction. The optional quench in line 27 may assist in quenching the reaction products to the desired temperature in the hot high-pressure separator 30. In the hot high pressure separator 30, the effluent from the SHC reactor 20 in line 28 is separated into a gaseous stream 32 and a liquid stream 34. The gaseous stream is the flash vaporization product at the temperature and pressure of the hot high pressure separator 30 and comprises between about 35 and 80 vol-% of the hydrocarbon product from the SHC reactor 20, preferably between about 50 and 70 vol-%. Likewise, the liquid stream is the flash liquid at the temperature and pressure of the hot high pressure separator 30. The gaseous stream is removed overhead from the hot high pressure separator 30 through line 32 while the liquid fraction is withdrawn at the bottom of the hot high pressure separator 30 through line 34.

The liquid fraction in line 34 is delivered to a hot flash drum 36 at the same temperature as in the hot high pressure separator 30 but at a pressure of about 690 to about 3,447 kPa (100 to 500 psig). The vapor overhead in line 38 is cooled in cooler 39 and joins line 42 which is the liquid bottoms from a cold high pressure separator in line 42 to make line 52. A liquid fraction leaves the hot flash drum in line 40.

The overhead stream from the hot high pressure separator 30 in line 32 is cooled in one or more coolers represented by cooler 44 to a lower temperature. A water wash (not shown) on line 32 is typically used to wash out salts such as ammonium bisulfide or ammonium chloride. The water wash would remove almost all of the ammonia and some of the hydrogen sulfide from the stream 32. The stream 32 is transported to a cold high pressure separator 46. In an aspect, the cold high pressure separator is operated at lower temperature than the hot high pressure separator 30 but at about the same pressure. The cold high pressure separator 46 is kept at a separation temperature between about 10° and 93° C. (50° and 200° F.), and in an aspect, at about the pressure of the SHC reaction. In the cold high pressure separator 46, the overhead of the hot high pressure separator 30 is separated into a gaseous stream 48 and a liquid stream 42. The gaseous stream is the flash vaporization fraction at the temperature and pressure of the cold high pressure separator 46. Likewise, the liquid stream is the flash liquid product at the temperature and pressure of the cold high pressure separator 46 and comprises between about 20 and 65 vol-% of the hydrocarbon product from the SHC reactor 20, preferably between about 30 and 50 vol-%. By using this type of separator, the outlet gaseous stream obtained contains mostly hydrogen with some impurities such as hydrogen sulfide, ammonia and light hydrocarbon gases.

The hydrogen-rich stream in line 48 may be passed through a packed scrubbing tower 54 where it is scrubbed by means of a scrubbing liquid in line 56 to remove hydrogen sulfide and ammonia. The spent scrubbing liquid in line 58 may be regenerated and recycled and is usually an amine. The scrubbed hydrogen-rich stream emerges from the scrubber via line 60 and is combined with fresh make-up hydrogen added through line 62 and recycled through recycle gas compressor 64 and line 22 back to the SHC reactor 20. Make-up hydrogen may be added upstream or downstream of the compressor 64, but if a quench is used, make-up line 62 should be downstream of the quench line 27.

The liquid fraction in line 42 carries liquid product to adjoin cooled hot flash drum overhead in line 38 leaving cooler 39 to produce line 52 which feeds a cold flash drum 66 at the same temperature as in the cold high pressure separator 46 and a lower pressure of about 690 to about 3,447 kPa (100 to 500 psig) as in the hot flash drum 36. The overhead gas in line 68 may be a fuel gas comprising $C_4$-material that may be recovered and utilized. The liquid bottoms in line 70 and the bottoms line 40 from the hot flash drum 36 each flow into the fractionation section 50.

The fractionation section is in downstream communication with the SHC reactor 20. "Downstream communication" means that at least a portion of material flowing to the component in downstream communication may operatively flow from the component with which it communicates. "Communication" means that material flow is operatively permitted between enumerated components. "Upstream communication" means that at least a portion of the material flowing from the component in upstream communication may operatively flow to the component with which it communicates. The fractionation section 50 may comprise one or several vessels although it is shown only as one vessel in FIG. 1. The fractionation section 50 may comprise a stripper vessel and an atmospheric column but in an aspect is just a single column. Inert gas such as medium pressure steam may be fed near the bottom of the fractionation section 50 in line 72 to strip lighter components from heavier components. The fractionation section 50 produces an overhead gas product in line 74, a naphtha product stream in side cut line 76, a diesel product stream in side cut line 78, an optional atmospheric gasoil (AGO) stream in side cut line 80 and a VGO and pitch stream in bottoms line 82.

Line 82 introduces a portion of the hydrocracked effluent in the bottoms stream from the fractionation section 50 to a fired heater 84 and delivers the heated bottom stream to a first vacuum column 90 maintained at a pressure between about 1 and 10 kPa (7 and 75 torr), preferably between about 1 and 7 kPa (10 and 53 torr) and at a vacuum distillation temperature resulting in an atmospheric equivalent cut point between light VGO (LVGO) and HVGO of between about 371° and 482° C. (700° and 900° F.), preferably between about 398° and 454° C. (750° and 850° F.) and most preferably between about 413° and 441° C. (775° and 825° F.). The first vacuum column is in downstream communication with fractionation section 50 and the SHC reactor 20. The first vacuum column is in an aspect, a distillation column with a three-stage eductor at the overhead to provide the vacuum in the column. Each stage of the eductor is co-fed with a gas stream such as steam to pull a vacuum upstream of the eductor in the vacuum column. Pressure is greater on the downstream side of each eductor stage, causing the overhead stream to condense in an accumulator to liquid products that can be recovered. Light gases leaving the third eductor stage can be recovered and in an aspect used as fuel in the fired heater 84. Other types of equipment for pulling the vacuum may be suitable. In an aspect, steam stripping may be used in the first vacuum column. Steam is delivered by line 99 to the first vacuum column 90 from a steam header 104.

Three fractions may be separated in the first vacuum column: an overhead fraction of diesel and lighter hydrocarbons in an overhead line 92, an LVGO stream boiling at no higher than 482° C. (900° F.) and typically above about 300° C. (572° F.) from a side cut in line 94, a HVGO stream boiling above 371° C. (700° F.) in side cut line 96 and a pitch stream obtained in a bottoms line 98 which boils above 450° C. (842° F.). Much of the HVGO in line 96 is typically recycled to the SHC reactor 20. The unrecycled portion of the HVGO is typically recovered as product for further conversion in other refinery operations. To minimize vapor generation which requires greater energy to pull the vacuum, a portion of the LVGO stream in line 94 is cooled by heat exchange and pumped back to the column in line 95 to condense as much condensable material as possible. A further side cut of slop wax in line 97, taken below the HVGO side cut line 96 and above the bottoms line 98 carrying the first pitch stream, may be recycled to the SHC reactor 20 which is in downstream communication with slop wax side cut line 97. In this case most or all of stream 96 would be recovered as HVGO product. By taking the side cut in line 97, less feed is sent to the second vacuum column 100 requiring it to have less capacity and the quality of the HVGO in line 96 is improved. The slop wax stream in line 97 will typically have an end boiling point below 621° C. (1150° F.) and preferably below 607° C. (1125° F.). VGO streams may also be recycled upstream to enhance separation operations.

The first pitch stream in line 98 is delivered to the second vacuum column 100 in line 98 which is in downstream communication with the first vacuum column 90, the fractionation column 50 and the SHC reactor 20. The first pitch stream in line 98 is unsuitable for bulk flow as a granular solid. It is thermally unstable in that it begins to crack at temperatures as low as about 300° C. if subjected to this temperature for sufficient time. The pitch in line 98 may have inorganic solids content which can be in the range as high as 6 to 10 wt-%. The high solids content could make the fired heater 84 prone to fouling by coke formation. The temperature required in the vacuum bottoms can be reduced by adding steam to reduce the hydrocarbon partial pressure or by reducing the vacuum pressure further which are both expensive. The temperature in the vacuum bottoms must be high to lift sufficient HVGO from the pitch. We have found that solidification of pitch comprising at least 30 wt-% VGO and hydrogen concentration above 7.3 wt-% provides sticky particles that are not easily handled in bulk at foreseeably high transportation temperatures. An outlet of the fired heater 84 at a temperature of 385° C. (725° F.) will enable the first vacuum column 90 to produce pitch with only 10 wt-% HVGO content, but may subject the heater 84 to excessive coking. Operating the first vacuum column 90 to produce pitch with no more than 30 wt-% HVGO can subject the first vacuum column 90 to excessive coking.

The present invention utilizes a second vacuum distillation column 100 to further lift HVGO from the pitch. In an aspect, the second vacuum distillation column is operated at a lower pressure than in the first vacuum column to obtain the lift of VGO necessary to produce pitch that can be formed into particles that are bulk manageable. The use of the second vacuum column 100 provides for a lower temperature in the fired heater 84 upstream of the first vacuum column 90 at or below about 377° C. (710° F.) and in an aspect at or below about 370° C. (698° F.), so fouling from coking is less likely. With steam stripping in the first vacuum column 90, the first pitch stream in line 98 may be delivered to the second vacuum column 100 at about 315° to about 350° C. (600° to 662° F.). In an aspect, the first pitch stream in line 98 may be directly delivered to the second vacuum column 100 without being subjected to heating or cooling equipment. In other words, line 98 may be devoid of heating or cooling equipment until it feeds the second vacuum column 100. However, some heating or cooling may be necessary. Alternatively, in an aspect, heat is added to the second vacuum column 100 via hot oil or steam. Consequently, the entry temperature of the first pitch stream 98 to the second vacuum column 100 is in an aspect, not more than 50° C. greater or smaller than the exit temperature of the first pitch stream 98 from the bottoms of the first vacuum column 90.

The second vacuum column 100 is in downstream communication with the bottoms of the first vacuum column 90. The second vacuum column 100 is maintained at a pressure between about 0.1 and 3.0 kPa (1 and 23 torr), preferably between about 0.2 and 1.0 kPa (1.5 and 7.5 torr) and at a vacuum distillation temperature of about 300° to about 370° C. (572° to 698° F.) resulting in an atmospheric equivalent cut point between HVGO and pitch of between about 454° and 593° C. (850° and 1100° F.), preferably between about 482° and 579° C. (900° and 1075° F.), and most preferably between about 510° and 552° C. (950° and 1025° F.). The second vacuum column 100 is in downstream communication with the first vacuum column 90, the fractionation section 50 and the SHC reactor 20.

The second vacuum column 100 may be a conventional vacuum column or it may have special functionality for driving the VGO from the pitch by generating a film of pitch for facilitating evaporation of lower boiling components from the pitch. Special film generating evaporators are able to promote evaporation of VGO sufficiently quickly to avoid coking Film generating evaporators may include an evaporator stripper, a thin film evaporator, a wiped film evaporator, a falling film evaporator, a rising film evaporator and a scraped surface evaporator. Some of these film generating evaporators may include a moving part for renewing the surface of the pitch in the second vacuum column 100. Other types of thin film generating evaporators may be suitable. For example, a thin film evaporator (TFE) heats up the pitch on an internal surface of a heated tube until the VGO starts to evaporate. The pitch is maintained as a thin film on the internal surface of the tube by a rotating blade with a fixed clearance. The VGO vapors are then liquefied on the cooler tubes of a condenser. A wiped film evaporator (WFE) is different from a TFE in that it uses a hinged blade with minimal clearance from the internal surface to agitate the flowing pitch to effect separation. In both TFE and WFE's pitch enters the unit tangentially above a heated internal tube and is distributed evenly over an inner circumference of the tube by the rotating blade. Pitch spirals down the wall while bow waves developed by rotor blades generate highly turbulent flow and optimum heat flux. VGO evaporates rapidly and vapors can flow either co-currently or counter currently against the pitch. In a simple TFE and WFE design, VGO may be condensed in a condenser located outside but as close to the evaporator as possible. A short path distillation unit is another kind of TFE or a WFE that has an internal condenser. A scraped surface evaporator (SSE) operates similarly to the principle of the WFE. However, an SSE does not endeavor to maintain only a thin film on the internal heated surface but endeavors to keep a film of pitch on the heated surface from overheating by frequent removal by a scraper.

In a falling film evaporator (FFE), the pitch enters the evaporator at the head and is evenly distributed into heating tubes. A thin film enters the heating tubes and flows downwardly at boiling temperature and is partially evaporated. Inert gas, such as steam, may be used for heating the tubes by contact with the outside of the tubes. The pitch and the VGO vapor both flow downwardly in the tubes into a lower separator in which the vaporous VGO is separated from the pitch.

A rising film evaporator (RFE) operates on a thermo-siphon principle. Pitch enters a bottom of heating tubes heated by steam provided on the outside of the tubes. As the pitch heats, vaporous VGO begins to form and ascend. The ascending force of this vaporized VGO causes liquid and vapors to flow upwardly in parallel flow. At the same time the production of VGO vapor increases and the pitch is pressed as a thin film on the walls of the tubes while ascending. The co-current upward movement against gravity has the beneficial effect of creating a high degree of turbulence in the pitch which promotes heat transfer and coke inhibition.

In an aspect, the special second vacuum column 100 for generating a thin film may be an evaporator stripper available from Artisan Industries of Waltham, Md. The second vacuum column 100 is shown to be an evaporator stripper in FIG. 1. The first pitch stream 98 may pass through an optional pre-evaporator 102 which may be an RFE to evaporate the bulk of the VGO from the pitch. An evaporator stripper may operate without the pre-evaporator 102. Steam or other inert gas enters an upper end of the pre-evaporator 102 from a steam header 104 and condensate exits at a lower end. Pitch and VGO enter an enlarged diameter flash section 108 of the evaporator stripper 100 via line 106. Vaporous VGO exits the top of the evaporator stripper perhaps through an entrainment separator such as a demister to knockout condensables. The vapor exits in line 110 and enters a condenser 112 and perhaps an accumulator 114. The vacuum is pulled from the condenser 112, perhaps by staged eductors or other suitable device. Line 116 takes VGO, in an aspect, primarily HVGO, to be recycled to the SHC reactor 20 in line 8. Accordingly, the SHC reactor 20 is in downstream communication with an overhead of the second vacuum column 100. A portion of the HVGO in line 116 may be recovered and issued as a net product in line 124. Pitch in the evaporator stripper 100 cascades downwardly over heated or unheated trays, such as tube-and-disc trays, while the remaining volatiles are stripped by the rising vapor. The trays provide a fresh liquid thin film at each stage, renewing the surface of the pitch film for evaporation and stripping. In an aspect, the trays may define interior cavities in communication with a heating fluid from line 126 for indirectly heating the pitch traveling over the trays. Heating fluid exits the second vacuum column 100 in line 128 for reheating. Inert gas, such as steam or nitrogen, may be sparged into the column from line 118 to strip the pitch and further enhance mass transfer. A second pitch stream is removed from the second vacuum column 100 in line 120 and comprises no more than about 30 wt-% VGO and preferably no more than about 25 wt-% VGO. In this context, no more than about 30 wt-%, in an aspect no more than about 25 wt-% and preferably no more than about 14 wt-% of the second pitch stream in line 120 from the second vacuum bottoms boils at or below about 538° C. (1000° F.). Furthermore, no more than about 30 wt-%, in an aspect no more than about 25 wt-% and preferably no more than about 14 wt-% of the second pitch stream in line 120 boils in a range between at or about 300° C. (572° F.) and at or about 538° C. (1000° F.). In an aspect, at least about 5 wt-% of the second pitch stream in line 120 is VGO that boils at or less than about 538° C. (1000° F.). The second pitch stream in line 120 also comprises a hydrogen concentration of about 7.3 wt-% or less, suitably about 6.9 wt-% or less and typically at least about 4.5 wt-% and preferably at least about 5 wt-% on an ash-free basis excluding inorganics. We have found that as long as the VGO concentration is no more than about 30 wt-% of the pitch, a suitably transportable pitch composition can be obtained if the hydrogen concentration is no more than 7.3 wt-% and preferably no more than about 6.9 wt-%. The second pitch stream may have a density of at least about 1.1 g/cc, suitably at least about 1.15 g/cc and typically no more than about 1.3 g/cc on an ash-free bases excluding inorganics. The second pitch stream may also contain about 1 to about 20 wt-% toluene insoluble organic residue (TIOR). "TIOR" represents non-catalytic solids in a portion of the slurry hydrocracked product boiling over 524° C. (975° F.).

The second vacuum column 100 is able to recover at least as much as about 15 wt-% VGO from the pitch stream in line 98. This recovered VGO leaves from vacuum column 100 in the overhead line 110 which may be recycled in lines 116, 8, 16 and 18 back to the SHC reactor 20.

The second pitch stream in vacuum bottoms line 120 may be discharged directly to a granulation machine 130. In an aspect, the temperature of the pitch in line 120 does not need to be adjusted by heat exchange to prepare the pitch for granulation. A particularly useful granulation machine 130 is a pastillation device called a Rotoformer provided by Sandvik Process Systems of Sandviken, Sweden which produces a half-spherical particle called a pastille. Other granulation machines can be melt strand granulators, underwater melt cutters, extruders with die plates, prilling systems, spray driers and the like. The granules produced should have a rounded or semi-rounded aspect which allows them to move freely in bulk handling and transfer systems. Rounded or semi-rounded granules are less likely to stick together because they have fewer points of contact and are less prone to dust formation because they lack sharp edges of flaked material.

A granulation machine 130 of the pastillation type comprises a heated cylindrical stator 134 which is supplied with molten pitch from the second pitch stream 120 or a storage tank 132. The granulation machine 130 is in downstream communication with the bottoms of the second vacuum column 100 via line 120. A rotating perforated cylindrical wall 136 turns concentrically around the stator 134 to form particles or pastilles of pitch by emission through openings in the perforated wall 136. The pastilles are deposited across the whole operating width of a metal conveyor belt 138 which is in an aspect, stainless steel. Heat released during solidification and cooling of the dropped pastilles is transferred through the belt 138 which is cooled by indirect heat exchange with cooling media such as water sprayed underneath the belt from line 140. The sprayed cooling water is collected in tanks and returned in line 142 to a water chilling system without contacting the pitch particles. A heated re-feed bar may force excess pitch remaining in the openings of the rotating cylindrical wall 136 into a position from which it is re-dropped onto the belt 138. The belt 138 conveys the pastilles into a collector 144. The pitch pastilles can now be easily handled in bulk and transported for consumption. The pitch pastilles may now be stored or transported without need of further intentional cooling. The pastilles will not stick together because sufficient conversion of the pitch has been achieved and sufficient VGO has been separated from the pitch to raise the onset of softening point temperature to above the highest anticipated transportation temperature. The highest anticipated temperature in transportation will necessarily depend on the climate of the route and type of container. A credible global maximum of 66° C. (150° F.) can be estimated from data of the International Safe Transit Association, OCEAN CONTAINER TEMPERATURE AND HUMIDITY STUDY, Preshipment Testing Newsletter (2d Quarter 2006).

Figure 2:
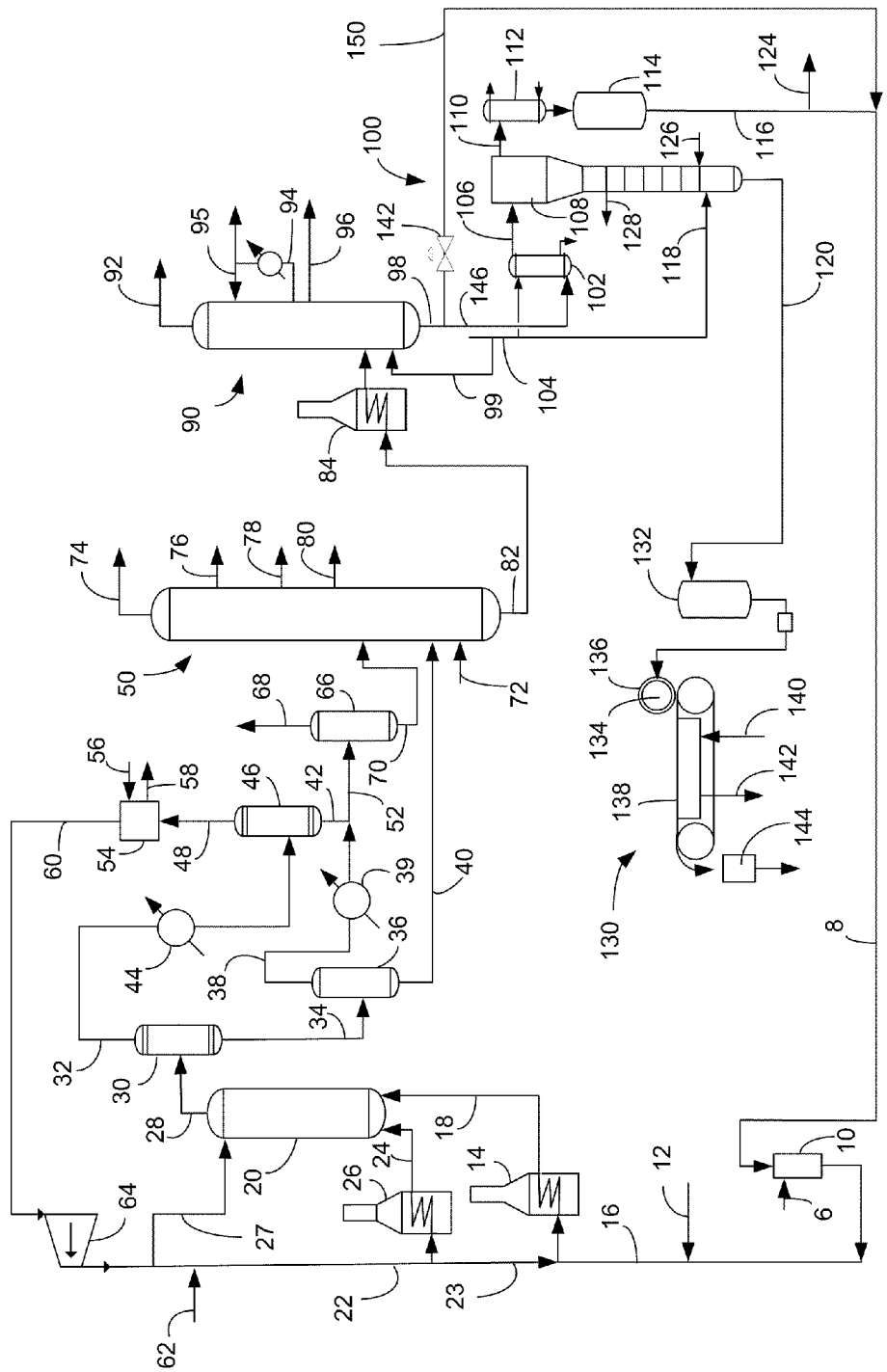
FIG. 2 is a schematic flow scheme showing an alternate process and apparatus of the present invention.

FIG. 2 depicts an alternative flow scheme of the present invention in which pitch recycle in line 150 from the first pitch stream in line 98 is recycled to the SHC reactor 20. FIG. 2 is the same as FIG. 1 with the exception of a pitch recycle line 150 that diverts a portion of the first pitch stream 98 regulated by a control valve 142 to bypass the second vacuum column 100 to join line 116 to feed line 8. Accordingly, the SHC reactor 20 is in downstream communication with a bottoms of the first vacuum column 100. All other aspects of the embodiment of FIG. 2 are the same as FIG. 1. At least a portion of the first pitch stream may optionally be recycled as a portion of the feed to the SHC reactor 20 in line 8. Remaining catalyst particles from SHC reactor 20 in the SHC effluent in line 28 will be present in the first pitch stream 98. A portion of the catalyst can be conveniently recycled back to the SHC reactor 20 along with a portion of the first pitch stream. This alternative will conserve SHC catalyst. The remaining portion of the first pitch stream in line 98 is delivered to the second vacuum column 100 in line 146. In this alternative aspect, the first vacuum column 90 may be flash column with no heat input or cooling.

Example 1

To determine which pitch materials can be solidified and transported, 66° C. (150° F.) was taken as a highest temperature to which pitch materials would be exposed during transportation, considering an acceptable safe operating margin. Pitch materials would have to be transportable up to this maximum temperature without beginning to stick together. That is, acceptable pitch composition must exhibit an onset of softening temperature of at least 66° C. (150° F.).

A procedure for using a thermomechanical analyzer (TMA) is similar to a procedure reported for measuring densities of powdered molding polymer by McNally, G. and McCourt, M., DENSITY MEASUREMENT OF THERMOPLASTIC POWDERS DURING HEATING AND COOLING CYCLES USING THERMAL MECHANICAL ANALYSIS, ANTEC 2002 Conference Proceedings, 1956-1960. A TMA Model Q400 from TA Instruments of New Castle, Del. was used to measure the melting onset temperature and the fusion temperature. About 10 mg of hand-ground, unsized pitch powder was introduced in a 7 mm aluminum pan. The layer of powder is covered with an aluminum cover plate. A quartz plunger on the lid measures the position of the lid. A load of 5 grams is imposed on the powder and the powder is heated 5° C. per minute. The pitch softens and collapses as the temperature is raised. The tabular data of position vs. temperature is collected and the first derivative of change in deflection vs. change in temperature at 5° C. intervals is plotted as a function of temperature. The melting or fusion point is the temperature of maximum negative displacement, when the rate of thermal expansion overtakes the rate of powder collapse and is seen as a distinct sharp valley on a rate plot. This valley is manifest because the powdered sample, after collapsing, begins now to expand as temperature is raised when it is in the liquid state. The onset of melting is defined as detectable deviation of 1% of the first derivative relative to the valley.

The onset melting temperature of 1% deformation, represented as T(1%), is defined in the following way:

$$T(1\%) \text{ is the temperature at which } (Z-Z_{liq})/(Z_0-Z_{liq}) = 0.01 \quad (1)$$

wherein
$Z$=position measured at temperature T;
$Z_0$=initial position of plunger with sample at ambient temperature; and
$Z_{liq}$=position at fusion point which is peak of the rate plot.

Seven residual pitch products were prepared from a mixture of slurry hydrocracker heavy product to illustrate the process required to achieve a non-sticky, free-flowing pitch granule. The starting material for each residual pitch product was the heavy fraction of the products obtained after 87 wt-% conversion, defined by material boiling above 524° C. (975° F.) converted to material boiling below 524° C. (975° F.) from slurry hydrocracking a bitumen vacuum tower bottoms. The vacuum tower bottoms was prepared from cold-produced bitumen from the Peace River (Seal) formation near Slave Lake, Alberta, Canada. This bitumen bottoms was slurry hydrocracked at 13.79 MPa (2000 psi) in the presence of hydrogen using an iron sulfate-based catalyst in a stirred continuous reactor. The hydrocracked products leaving the reactor were flashed to remove products lighter than middle distillate and stripped of hydrogen and all non-condensable products. The starting material for further fractionation will be hereafter referred to as heavy ends (HE).

Sample 1 was a pitch pastille prepared by subjecting HE to conventional vacuum fractionation. The solidified pastille of Sample 1 did not move freely and was visibly sticky at room temperature. The onset of deformation as measured by TMA was 44° C. Sample 1 is not acceptable for bulk handling and transport.

Sample 2 was a clarified pitch produced from the following process: HE was allowed to settle in a reservoir, and the solids-free liquid was then vacuum flashed at 380° C. and 5 torr (0.7 kPa). The clarified heavy vacuum-flashed liquid was not subjected to further treatment. It was not visibly sticky and had a onset of softening point of 72.5° C. which is marginally above the maximum transportation temperature. Therefore, material 2 is marginally acceptable.

Sample 3 was a de-oiled sludge produced from the HE settling operation that was used to make Sample 2. The physical separation consisted of draining oil off the vacuum flashed liquid on a sieved tray while volatiles were allowed to evaporate off. The de-oiled sludge was then subjected to vacuum evaporation by a falling film evaporator under high vacuum of 0.3 kPa (2 torr) but not subjected to further treatment. Like Sample 1, it was visibly sticky and also did not move freely. The onset of softening point of 52.7° C. for material 3 is not acceptable. Its VGO content was determined by a mass balance to be about 14 wt-%.

Samples 4 and 5 were pitch samples in which HE was vacuum fractionated in a laboratory batch still at deep vacuum with magnetic stirring. Samples 4 and 5 are acceptable because they have a higher onset of softening point temperature than the maximum transportation temperature. However, sample 5 was heated to a temperature of about 320° C. to drive off more of the VGO. At this temperature some thermal cracking occurred. Partially pyrolyzing a pitch material will increase its onset of softening point temperature. However, the pitch will be harder to manage due to its higher fluid viscosity and the high temperature will cause coking on heat exchange surfaces. Moreover, thermal cracking will generate a higher volume of gases which will quickly overcome the capacity of the vacuum system, especially at low absolute pressures.

Samples 6 and 7 were prepared by a first step of vacuum fractionating the HE and a second step of sending to a wiped film evaporator running at 300° C. internal flash temperature and 0.1 and 0.3 kPa (0.7 and 2.5 torr) respectively. Samples 6 and 7 were subsequently granulated by re-melting and forming into 7 mm half-round pastilles on a Sandvik Rotoformer. The pastilles were non-sticky and free-flowing without any agglomeration, even at 100° C., confirming that the granulated material could be handled at temperatures above any possible transportation temperature.

Table 1 below shows the results of the tests. VGO fraction is defined by the fraction of the pitch that boils at or below 538° C. (1000° F.). Pitch with VGO fractions less than 14 wt-% had acceptable onset of softening point temperatures generally for bulk handling.

TABLE 1

| Sample No. | Fusion Point, °C. | Onset of Softening Point, °C. | VGO Fraction, wt-% |
|---|---|---|---|
| 1 | 86.1 | 43.7 | 18 |
| 2 | 96.4 | 72.5 | 13 |
| 3 | 88.1 | 52.7 | 14 |
| 4 | 116.5 | 72.2 | 2 |
| 5 | 169.5 | 118.5 | 2 |
| 6 | 153.5 | 113.8 | 1 |
| 7 | 143.7 | 95.0 | 1.5 |

Example 2

A vacuum residue of Russian Urals heavy-sour crude was slurry hydrocracked in a pilot plant reactor at 13.8 MPa (2000 psi) in the presence of hydrogen using an iron sulfate-based catalyst. The pilot plant was run in full recycle mode with recovery of VGO from the pitch by a wiped film evaporator running at 300-320° C. and around 67 to 267 Pa (0.5-2 torr). The HVGO fraction 427-524° C. (800-975° F.) was recycled to the SHC reactor. Pitch samples were tested for onset softening temperature by TMA and for hydrogen and other properties. Concentrations were calculated on an ash-free basis. The results are shown in Table 2.

TABLE 2

| Test No. | units | 31 | 33 | 35 | 37 | 38 | 39 | 41 |
|---|---|---|---|---|---|---|---|---|
| VGO concentration | wt-% | 8.3 | 10.6 | 15.3 | 9.3 | 6.4 | 23.0 | 7.6 |
| Conversion | wt-% | 67.7 | 69.0 | 78.9 | 86.3 | 85.1 | 85.8 | 86.3 |
| TMA Onset Temperature | °C. | 29.2 | 32.5 | 43.6 | 82.7 | 78.3 | 66.6 | 72.7 |
| Hydrogen | wt-% | 8.6 | 8.9 | 8.1 | 7.4 | 6.5 | 6.9 | 6.5 |
| Density | g/ml | 1.28 | 1.02 | 1.17 | 1.27 | 1.20 | 1.23 | 1.08 |
| TIOR concentration | wt-% | 2.8 | 2.5 | 7.7 | 10.2 | 16.2 | 11.0 | 12.0 |

It can be seen that VGO concentration does not necessarily directly correlate with onset temperature because test 39 with 23 wt-% VGO has an acceptable onset temperature; whereas, test 31 with 8.3 wt-% VGO does not.

Figure 3:
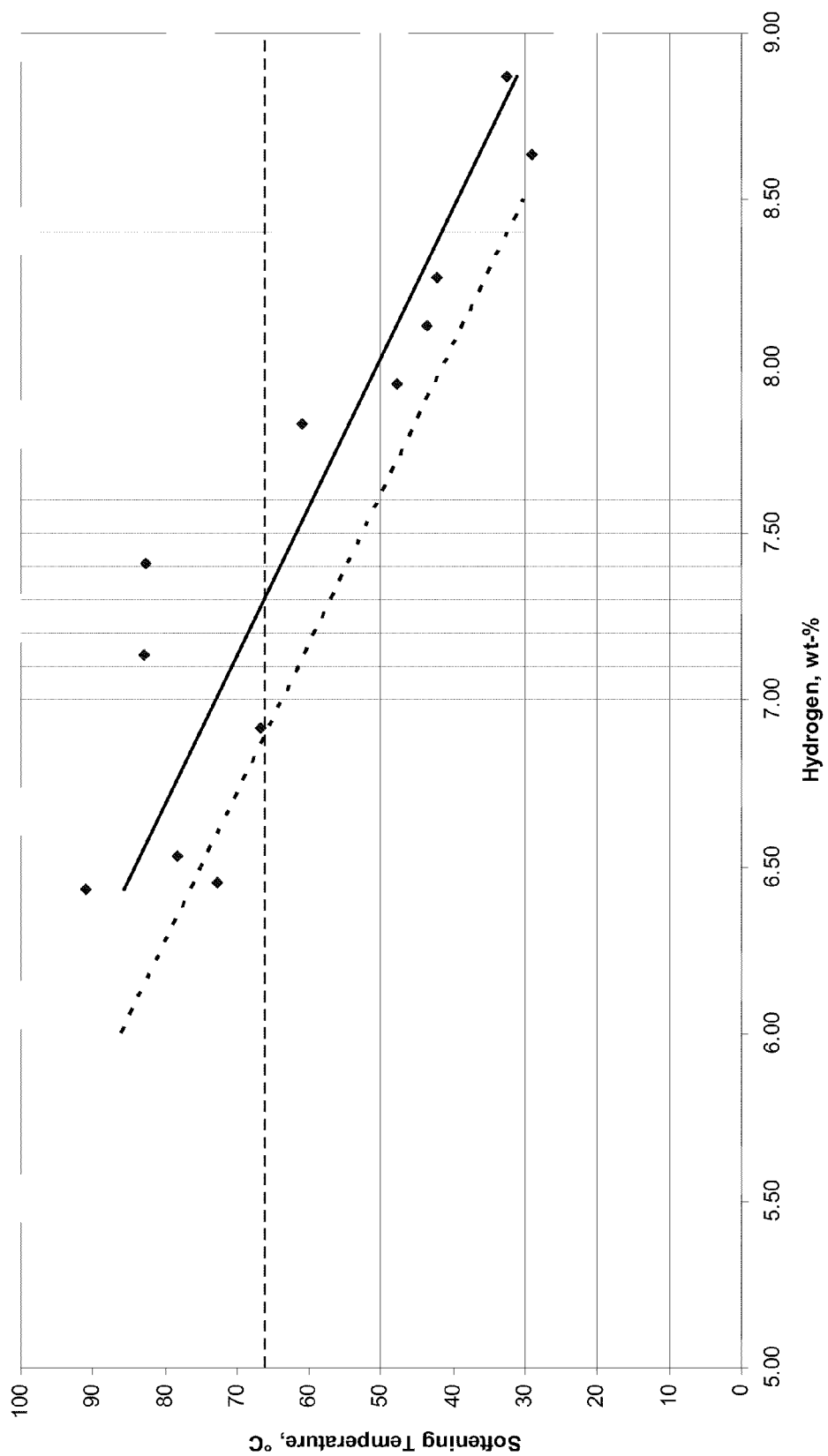
FIG. 3 is a graph of softening temperature as a function of hydrogen concentration for pitch.

FIG. 3 shows a plot of the onset temperature as a function of wt-% hydrogen in the pitch from the data in Table 2. A horizontal dashed line marks the maximum transportation temperature of 66° C., explained above. The solid diagonal line represents a linear regression of all the data points which intercepts 66° C. at about 7.3 wt-% hydrogen. The relationship for the linear regression is TMA Onset of Softening Temperature (° C.)=−22.4×(wt-% hydrogen in pitch)+229.6. A dotted diagonal line provides a margin of safety because it is to the left of all other data points below the maximum transportation temperature, so capturing all of the data in the region of interest. The dotted diagonal line intercepts 66° C. at 6.9 wt-% hydrogen. The dotted line has the same slope as the solid line, but a y-intercept of 220.3.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A composition of pitch comprising hydrocarbon material boiling above 538° C., with no more than about 30 wt-% VGO, a hydrogen concentration of no more than about 7.3 wt-% on an ash-free basis and at least about 10.2 wt-% toluene insoluble organic residue.

2. The composition of claim 1 further comprising an exhibition of onset of softening point temperature of at least 66° C.

3. The composition of claim 1 further comprising no more than about 25 wt-% VGO.

4. The composition of claim 1 further comprising no more than about 14 wt-% VGO.

5. The composition of claim 1 further comprising at least about 1 wt-% VGO.

6. The composition of claim 1 further comprising an exhibition of hydrogen concentration of no more than about 6.9 wt-% or less.

7. The composition of claim 1 further comprising a hydrogen concentration of at least about 4.5 wt-%.

8. The composition of claim 7 further comprising a hydrogen concentration of at least about 5 wt-%.

9. A composition of pitch comprising hydrocarbon material boiling above 538° C. and exhibiting an onset of softening point temperature of at least 66° C. with no more than about 30 wt-% VGO, at least about 10.2 wt-% toluene insoluble organic residue and a hydrogen concentration of no more than about 6.9 wt-% on an ash-free basis.

10. The composition of claim 9 further comprising a hydrogen concentration of at least about 5 wt-%.

11. The composition of claim 9 further comprising no more than about 14 wt-% VGO.

12. The composition of claim 9 further comprising at least about 1 wt-% VGO.

13. The composition of claim 9 further comprising a density of at least about 1.15 g/cc.

14. The composition of claim 9 further comprising a density of no more than about 1.3 g/cc.

15. A composition of pitch comprising hydrocarbon material boiling above 538° C. with less than about 30 wt-% VGO, a hydrogen concentration of no more than about 7.3 wt-% on an ash-free basis and a toluene insoluble organic residue of at least about 10.2 wt-%.

16. The composition of claim 15 further comprising no more than about 6.9 wt-% hydrogen.

17. The composition of claim 15 further comprising an exhibition of onset of softening point temperature of at least 66° C.

18. The composition of claim 15 further comprising at least about 4.5 wt-% hydrogen.

* * * * *